US010569735B2

United States Patent
Elson et al.

(10) Patent No.: US 10,569,735 B2
(45) Date of Patent: *Feb. 25, 2020

(54) VEHICLE SEAT BELT SYSTEM HAVING UNIFORM AIR DELIVERY

(71) Applicant: Ford Global Technologies, LLC, Dearborn, MI (US)

(72) Inventors: John Craig Elson, Bloomfield Township, MI (US); Kerrie Kathleen Gath, Pittsfield, MI (US); Clay Wesley Maranville, Ypsilanti, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/834,217

(22) Filed: Dec. 7, 2017

(65) Prior Publication Data

US 2019/0176747 A1    Jun. 13, 2019

(51) Int. Cl.
| | | |
|---|---|---|
| *B60R 21/18* | (2006.01) | |
| *B60R 22/12* | (2006.01) | |
| *B60R 22/14* | (2006.01) | |
| *B60R 22/28* | (2006.01) | |
| *B60R 21/239* | (2006.01) | |

(Continued)

(52) U.S. Cl.
CPC .......... *B60R 22/12* (2013.01); *B60H 1/00271* (2013.01); *B60H 1/22* (2013.01); *B60R 21/18* (2013.01); *B60R 2022/1806* (2013.01)

(58) Field of Classification Search
CPC . B60R 22/12; B60R 2022/1806; B60R 21/18; B60R 21/239; B60R 22/14; B60R 22/28; B60H 1/00271; B60H 1/22
See application file for complete search history.

(56) References Cited

U.S. PATENT DOCUMENTS

| | | | |
|---|---|---|---|
| 3,306,662 A | 2/1967 | Finnigan | |
| 3,682,498 A * | 8/1972 | Rutzki | B60R 21/18 |
| | | | 280/733 |

(Continued)

FOREIGN PATENT DOCUMENTS

| | | |
|---|---|---|
| AT | 300591 | 7/1972 |
| DE | 102008034633 A1 | 1/2010 |

(Continued)

OTHER PUBLICATIONS

U.S. Appl. No. 15/834,170, filed Dec. 7, 2017, entitled "Vehicle Seat Belt System Having Electrical Connector," (21 pages of specification and 22 pages of drawings) and filing receipt.

(Continued)

*Primary Examiner* — Barry Gooden, Jr.
(74) *Attorney, Agent, or Firm* — Vichit Chea; Price Heneveld LLP (57) ABSTRACT

A vehicle seat belt system is provided. The vehicle seat belt system includes a seat belt comprising a tubular seat belt webbing defining a passageway and a plurality of exhaust openings located along a length of the webbing, and an air delivery device supplying air to the seat belt. The seat belt is configured such that air flowing out of the exhaust openings is substantially evenly distributed along the length of the webbing.

20 Claims, 8 Drawing Sheets

(51) Int. Cl.
*B60H 1/22* (2006.01)
*B60H 1/00* (2006.01)
*B60R 22/18* (2006.01)

(56) References Cited

U.S. PATENT DOCUMENTS

| | | |
|---|---|---|
| 3,801,156 A | 4/1974 | Granig |
| 3,820,814 A | 6/1974 | Allgaier et al. |
| 3,865,398 A * | 2/1975 | Woll ................. B60R 21/18 280/733 |
| 3,866,940 A * | 2/1975 | Lewis ................. B60R 21/18 280/733 |
| 3,874,694 A * | 4/1975 | Stephenson ............ B60R 21/18 280/733 |
| 3,887,213 A | 6/1975 | Goetz |
| 3,905,615 A | 9/1975 | Schulman |
| 3,970,329 A * | 7/1976 | Lewis ................. B60R 21/18 280/733 |
| 3,975,258 A | 8/1976 | Fox |
| 4,370,784 A | 2/1983 | Turnbull |
| 4,565,991 A | 1/1986 | Lupoli et al. |
| 5,016,913 A | 5/1991 | Nakajima et al. |
| 5,246,083 A * | 9/1993 | Graf ................. B60R 21/164 180/271 |
| 5,346,250 A * | 9/1994 | Kamiyama ........ A44B 11/2503 280/733 |
| 5,385,367 A * | 1/1995 | Tanaka ................. B60R 21/18 280/733 |
| 5,445,411 A * | 8/1995 | Kamiyama ........ A44B 11/2523 280/733 |
| 5,466,003 A * | 11/1995 | Tanaka ............... A44B 11/2523 280/733 |
| 5,474,326 A * | 12/1995 | Cho ................. B60R 21/18 280/733 |
| 5,492,363 A | 2/1996 | Hartmeyer et al. |
| 5,494,314 A * | 2/1996 | Kriska ................. B60R 21/233 280/740 |
| 5,653,741 A | 8/1997 | Grant |
| 5,727,814 A | 3/1998 | White |
| 5,730,121 A | 3/1998 | Hawkins, Jr. et al. |
| 5,765,869 A * | 6/1998 | Huber ................. B60R 21/18 280/733 |
| 6,019,388 A * | 2/2000 | Okazaki ............. A44B 11/2523 280/733 |
| 6,039,347 A * | 3/2000 | Maynard ............... B60R 21/264 280/736 |
| 6,062,597 A * | 5/2000 | Suyama ................. B60R 21/18 280/733 |
| 6,082,763 A * | 7/2000 | Kokeguchi ............. B60R 21/18 280/733 |
| 6,220,626 B1 | 4/2001 | Utsumi et al. |
| 6,443,487 B1 | 9/2002 | Suyama |
| 6,471,243 B1 | 10/2002 | Brown |
| 6,540,040 B1 * | 4/2003 | Patel ................. B60R 22/48 180/268 |
| 6,630,414 B1 | 10/2003 | Matsumoto |
| 6,737,610 B1 | 5/2004 | Horn et al. |
| 7,201,024 B2 | 4/2007 | Hirayama et al. |
| 7,434,833 B2 | 10/2008 | Kore |
| 7,543,849 B2 | 6/2009 | Bradburn |
| 7,770,921 B2 | 8/2010 | Mueller et al. |
| 7,788,952 B2 | 9/2010 | Morrison |
| 7,977,608 B2 | 7/2011 | Diemer et al. |
| 8,269,512 B2 | 9/2012 | Ootaka |
| 8,876,580 B2 | 11/2014 | Castro |
| 9,027,961 B2 | 5/2015 | Yamataki |
| 9,204,493 B2 | 12/2015 | Yoshimoto et al. |
| 9,346,430 B2 | 5/2016 | Wang et al. |
| 9,539,983 B2 | 1/2017 | Demeritte |
| 9,744,933 B1 * | 8/2017 | Rao ................. B60R 21/01554 |
| 9,902,358 B2 * | 2/2018 | Okubo ................. B60R 21/18 |
| 9,981,623 B2 | 5/2018 | Kobata |
| 10,143,043 B1 | 11/2018 | Elson et al. |
| 2002/0101066 A1 * | 8/2002 | Tanase ................. B60R 21/232 280/730.2 |
| 2002/0125701 A1 * | 9/2002 | Devonport ............. B60R 21/18 280/733 |
| 2002/0125702 A1 * | 9/2002 | Ohhashi ................. B60R 21/18 280/733 |
| 2003/0038463 A1 * | 2/2003 | Stonich ................. B60R 21/18 280/733 |
| 2003/0206834 A1 | 11/2003 | Chiao et al. |
| 2003/0222446 A1 | 12/2003 | Soderquist et al. |
| 2004/0140660 A1 | 7/2004 | Xu |
| 2004/0262294 A1 | 12/2004 | Horey et al. |
| 2005/0160617 A1 * | 7/2005 | Fouts, II ............. A43D 3/1408 34/202 |
| 2005/0189752 A1 * | 9/2005 | Itoga ................. B60R 21/231 280/741 |
| 2006/0208471 A1 | 9/2006 | Sundararajan et al. |
| 2007/0170710 A1 | 7/2007 | Bouquier |
| 2008/0252052 A1 * | 10/2008 | Schneider ............. B60R 21/239 280/736 |
| 2008/0296939 A1 * | 12/2008 | Bajic ................. B60H 1/00285 297/180.1 |
| 2009/0301339 A1 | 12/2009 | Ito et al. |
| 2011/0068565 A1 * | 3/2011 | Arnold ................. B60R 21/18 280/733 |
| 2011/0282637 A1 | 11/2011 | Yeh |
| 2012/0055914 A1 | 3/2012 | Goto et al. |
| 2012/0242115 A1 | 9/2012 | Schreiber |
| 2013/0026744 A1 | 1/2013 | Fischer et al. |
| 2013/0106083 A1 | 5/2013 | Burczyk et al. |
| 2014/0062071 A1 * | 3/2014 | Ishiguro ................ B60R 21/239 280/739 |
| 2014/0080373 A1 | 3/2014 | Keitsch |
| 2014/0225354 A1 | 8/2014 | Williams et al. |
| 2014/0246415 A1 | 9/2014 | Wittkowski |
| 2015/0054268 A1 | 2/2015 | Raines et al. |
| 2015/0084323 A1 * | 3/2015 | Han ................. B60R 22/14 280/807 |
| 2015/0239422 A1 * | 8/2015 | Ishiguro ............. B60R 21/203 280/731 |
| 2016/0059818 A1 * | 3/2016 | Witt ................. B60R 21/237 280/741 |
| 2016/0059819 A1 * | 3/2016 | Witt ................. B60R 21/18 280/733 |
| 2016/0236641 A1 * | 8/2016 | Okubo ................. B60R 21/18 |
| 2016/0250987 A1 * | 9/2016 | Okubo ................. B60R 21/18 280/729 |
| 2016/0303943 A1 * | 10/2016 | Arens ................. B60R 22/12 |
| 2017/0190310 A1 | 7/2017 | Okubo et al. |
| 2017/0196516 A1 * | 7/2017 | Matsumoto ........... B60R 22/023 |
| 2017/0341621 A1 | 11/2017 | Helvoort et al. |
| 2018/0281726 A1 * | 10/2018 | Murakami ............. B60R 21/18 |
| 2019/0023212 A1 | 1/2019 | Spahn et al. |

FOREIGN PATENT DOCUMENTS

| | | |
|---|---|---|
| FR | 2765834 A1 | 1/1999 |
| JP | 4331853 B2 | 9/2009 |
| JP | 2013226882 A | 11/2013 |
| JP | 2015039901 A | 3/2015 |
| JP | 2016144980 A | 8/2016 |
| WO | 2015061494 A1 | 4/2015 |

OTHER PUBLICATIONS

U.S. Appl. No. 15/834,191, filed Dec. 7, 2017, entitled "Heated Seat Belt," (21 pages of specification and 22 pages of drawings) and filing receipt.
U.S. Appl. No. 15/834,247, filed Dec. 7, 2017, entitled "Vehicle Seat Belt System Having Air Distribution Manifold," (12 pages of specification and 5 pages of drawings) and filing receipt.
U.S. Appl. No. 15/834,266, filed Dec. 7, 2017, entitled "Vehicle Seat Belt Having Tubes for Air Delivery," (14 pages of specification and 6 pages of drawings) and filing receipt.
U.S. Appl. No. 15/653,602, filed Jul. 19, 2017, entitled "Tubular Seat Belt System Having Air Delivery," (13 pages of specification (56) References Cited

OTHER PUBLICATIONS and 7 pages of drawings) and filing receipt.
U.S. Statutory Invention Registration No. H902, published Apr. 2, 1991, to Rousseau.

* cited by examiner

VEHICLE SEAT BELT SYSTEM HAVING UNIFORM AIR DELIVERY

FIELD OF THE INVENTION

The present invention generally relates to vehicle seat belts, and more particularly relates to the delivery of air through the seat belt for enhanced occupant comfort.

BACKGROUND OF THE INVENTION

Automotive vehicles are typically equipped with seat belts for restraining passengers seated in vehicle seats. Conventional seat belts typically include a lap belt and a shoulder belt connected to a buckle which, in turn, connects to the vehicle structure, such as a seat or floor. The seat belt is typically made of a seat belt webbing that contacts the body of the seated passenger. The webbing is somewhat permeable to water vapor and can buildup thermal energy and cause discomfort for some passengers. It is desirable to provide for a seat belt system that provides enhanced air flow for the seated passenger.

SUMMARY OF THE INVENTION

According to one aspect of the present invention, a vehicle seat belt system is provided. The vehicle seat belt system includes a seat belt comprising a tubular seat belt webbing defining a passageway and a plurality of exhaust openings located along a length of the webbing, and an air delivery device supplying air to the seat belt, wherein the seat belt is configured such that air flowing out of the exhaust openings is substantially evenly distributed along the length of the webbing.

Embodiments of the first aspect of the invention can include any one or a combination of the following features:
  the exhaust openings comprise openings that vary in size, wherein the size of the openings increase with distance from an air inlet along the length of the webbing;
  the exhaust openings vary in number at different locations along the webbing, wherein the number of openings increase with distance from an air inlet along the length of the webbing;
  the seat belt system further includes a material within the webbing that varies the air flow resistance to control pressure drop through the exhaust openings;
  the material comprises at least one of rubber, nylon, polyester and polyurethane;
  the webbing has a plurality of air flow passages, each air flow passage controlled to distribute substantially the same air flow to separate sections along the length of the webbing;
  the seat belt comprises a shoulder belt, wherein the passageway and plurality of exhaust openings are formed in the shoulder belt; and
  the seat belt system further includes a buckle for connecting with the seat belt webbing, wherein air from the air delivery system enters the webbing through the buckle.

According to another aspect of the present invention, a vehicle seat belt system is provided. The vehicle seat belt system includes a seat belt comprising a tubular seat belt webbing defining a passageway having an air inlet and a plurality of exhaust openings located along a length of the webbing, and an air delivery device supplying air to the air inlet into the passageway, wherein the seat belt is configured such that air flowing out of the exhaust openings is substantially evenly distributed along the length of the webbing.

Embodiments of the second aspect of the invention can include any one or a combination of the following features:
  the exhaust openings comprise openings that vary in size, wherein the size of the openings increase with distance from the air inlet along the length of the webbing;
  the exhaust openings vary in number at different locations along the webbing, when the number of openings increase with distance from the air inlet along the length of the webbing;
  the seat belt system further includes a material within the webbing that varies the air flow resistance to control pressure drop through the exhaust openings;
  the material comprises at least one of rubber, nylon, polyester and polyurethane;
  the webbing has a plurality of air flow passages, each air flow passage controlled to distribute substantially the same air flow to separate sections along the length of the webbing;
  the seat belt comprises a shoulder belt, wherein the passageway and plurality of exhaust openings are formed in the shoulder belt;
  the seat belt system further includes a buckle for connecting with the seat belt webbing, wherein air from the air delivery system enters the webbing through the buckle.

According to a further aspect of the present invention, a vehicle is provided. The vehicle includes a seat assembly and a seat belt system operatively coupled to the seat assembly. The seat belt system includes a seat belt comprising a tubular seat belt webbing defining a passageway and a plurality of exhaust openings located along a length of the webbing, and an air delivery device supplying air to the seat belt, wherein the seat belt is configured such that air flowing out of the exhaust openings is substantially evenly distributed along the length of the webbing.

Embodiments of the third aspect of the invention can include any one or a combination of the following features:
  the exhaust openings comprise openings that vary in size, wherein the size of the openings increase with distance from an air inlet along the length of the webbing;
  the exhaust openings vary in number at different locations along the webbing, wherein the number of openings increase with distance from an air inlet along the length of the webbing; and
  the vehicle further includes a material within the webbing that varies the air flow resistance.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
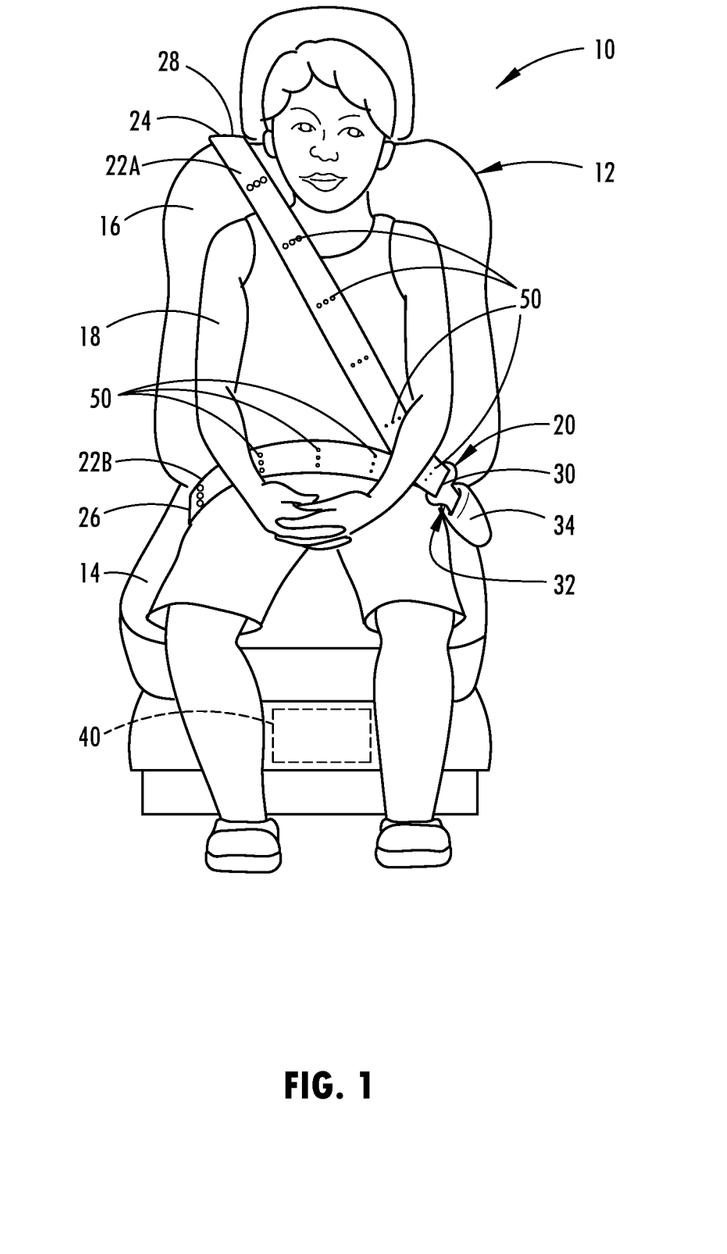
FIG. 1 is a perspective view of the passenger cabin of an automotive vehicle having a seat belt system restraining a person seated on a seat assembly and configured with air delivery, according to one embodiment.

Referring now to FIG. 1, a portion of the passenger cabin or compartment of a vehicle 10 is generally illustrated having a seat belt system 20 assembled onto a seat assembly 12 and including an air delivery arrangement for delivering forced air to a passageway in the seat belt webbing and out exhaust openings, according to one embodiment. The vehicle 10 may include a wheeled motor vehicle, such as a car, truck, van or any other type of vehicle that includes a seat belt system. The seat assembly 12 is generally illustrated including a lower seat 14 pivotally connected to an upper seat back 16 and configured to receive and retain a seated passenger 18. It should be appreciated that the vehicle 10 may include a plurality of seat assemblies 12 each including a seat belt system 20 as shown and described herein.

The seat belt system 20 is shown as a three-point seat belt configuration having a tubular seat belt webbing 24 connected at a first connection point 28 generally near the top of the seat back 16 or another supporting portion within the vehicle such as the B-pillar, a second connection point 26 connected to the floor or the seat 14 of the vehicle generally in the region of the lap of the passenger seated on the seat 14, and a third connection point 30 shown connected to a connector tongue 32 which releasably connects or fastens to a seat belt buckle 34. The connector tongue 32 is matingly and releasably coupled to the seat belt buckle 34 for fastening the connector tongue 32 onto the buckle 34. The seat belt system 20 includes the seat belt comprising the tubular seat belt webbing 24 defining an interior passageway and a plurality of air exhaust openings 50 formed therein. In the embodiments shown, the seat belt webbing 24 includes a shoulder belt 22A that is generally positioned to extend from the lap over the shoulder and chest of a passenger and a lap belt 22B which is positioned to extend over the lap of the passenger when seated in the seat assembly 12. The lap belt 22B and shoulder belt 22A may be connected to one another or may be separate belts. It should be appreciated that the shoulder belt 22A or the lap belt 22B or both the shoulder belt 22A and lap belt 22B as shown may include the tubular passageway operatively coupled to the air delivery and air exhaust openings 50 for outputting forced air, according to various embodiments.

The vehicle seat belt system 20 also includes an air delivery device 40 for supplying forced air to the seat belt webbing 24. The air delivery device 40 may be located within or below the vehicle seat assembly 12, as shown in FIG. 1, according to one embodiment. It should be appreciated that the air delivery device 40 may be a shared or dedicated air delivery system and may be located elsewhere on the vehicle. The air delivery device 40 may include a heating, ventilation and air conditioning (HVAC) system for delivering heated or cooled air through air ducts. In addition, the air delivery device 40 may deliver air in the form of increased concentrations of oxygen, humidified air, or olfactory scented air, which may be delivered into a supply passageway 36 within the seat belt webbing 24 and output through the exhaust openings 50. The air delivery device 40 delivers forced air into the supply passageway 36 in the seat belt buckle 34 and the forced air passes through the connector tongue 32 into the seat belt passageway 48 in the seat belt webbing 24, according to one embodiment.

Figure 2:
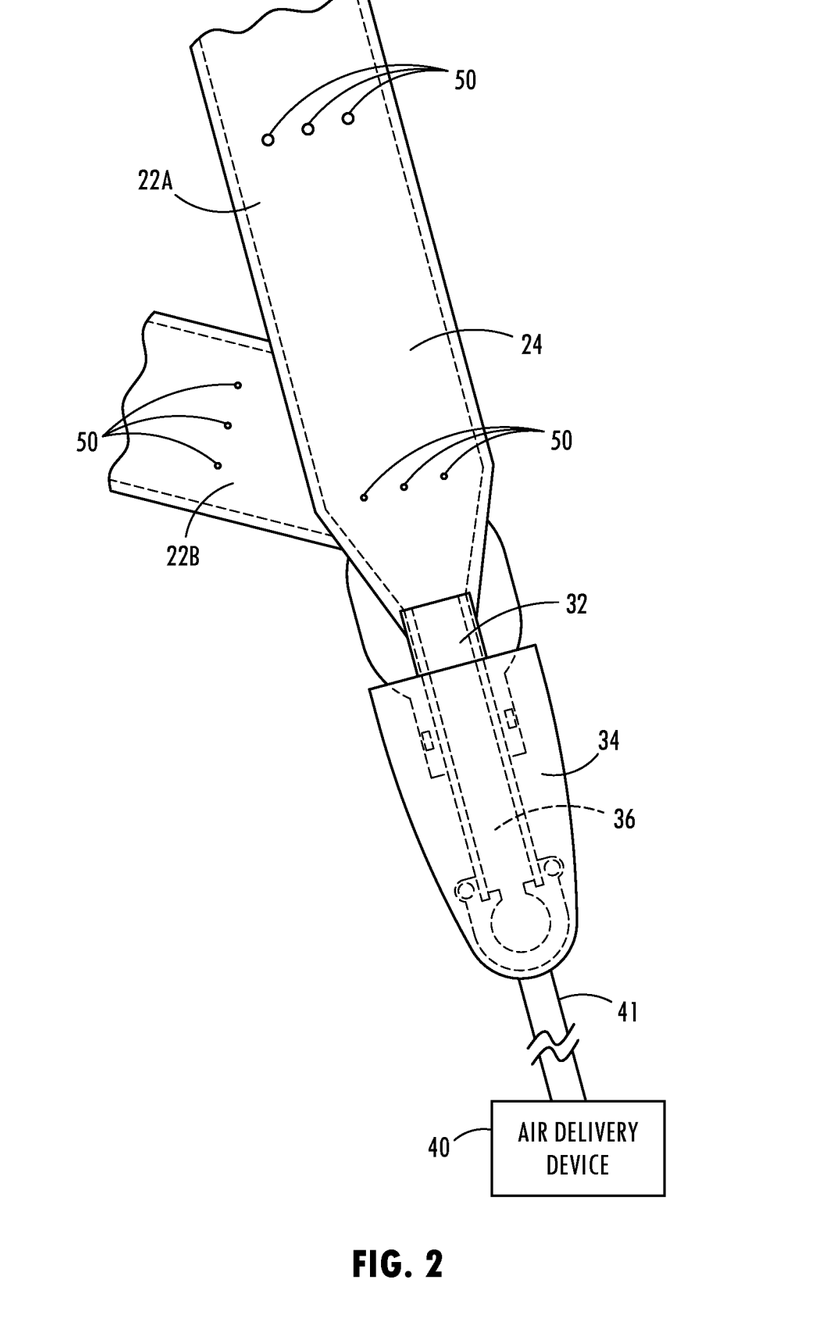
FIG. 2 is an enlarged side view of a portion of the seat assembly illustrating an air delivery system coupled to the seat belt buckle for delivery of air to the seat belt webbing.

As seen in FIG. 2, the air delivery device 40 delivers forced air to the air flow supply passageway 36 within the seat belt buckle 34 and the connector tongue 32 fastened thereto. The connector tongue 32 and buckle 34 may have cooperating interior chambers that form the air flow supply passageway 36 similar to those employed in a seat belt airbag system, according to one embodiment. The air delivery device 40 may include a fan to force air into the seat belt passageway 48 in the seat belt webbing 24. The forced air builds up a pressure within the seat belt passageway 48 due to resistance in the partially closed chamber formed by the passageway 48. The air delivery device 40 delivers forced air via a tube 41 into the air supply passageway 36 at a pressure to blow air into seat belt passageway 48 and out of the exhaust openings 50 in close proximity to the occupant. It should be appreciated that the vehicle seat belt system 20 may also employ a seat belt airbag which may share an air delivery passageway in the connector tongue 32 and buckle 34.

The vehicle seat belt system 20 includes the seat belt having the tubular seat belt webbing 24 defining the seat belt passageway 48 and a plurality of outlets or exhaust openings 50 located along a length of the webbing 24 with the seat belt configured such that air flowing out of the exhaust openings 50 is substantially evenly distributed along the length of the webbing 24. By distributing the amount of air exiting the webbing 24 substantially uniformly across the length of the webbing 24, the heated or cooled or other forced air is distributed proximate to the seated occupant in a substantially uniform manner.

Figure 3:
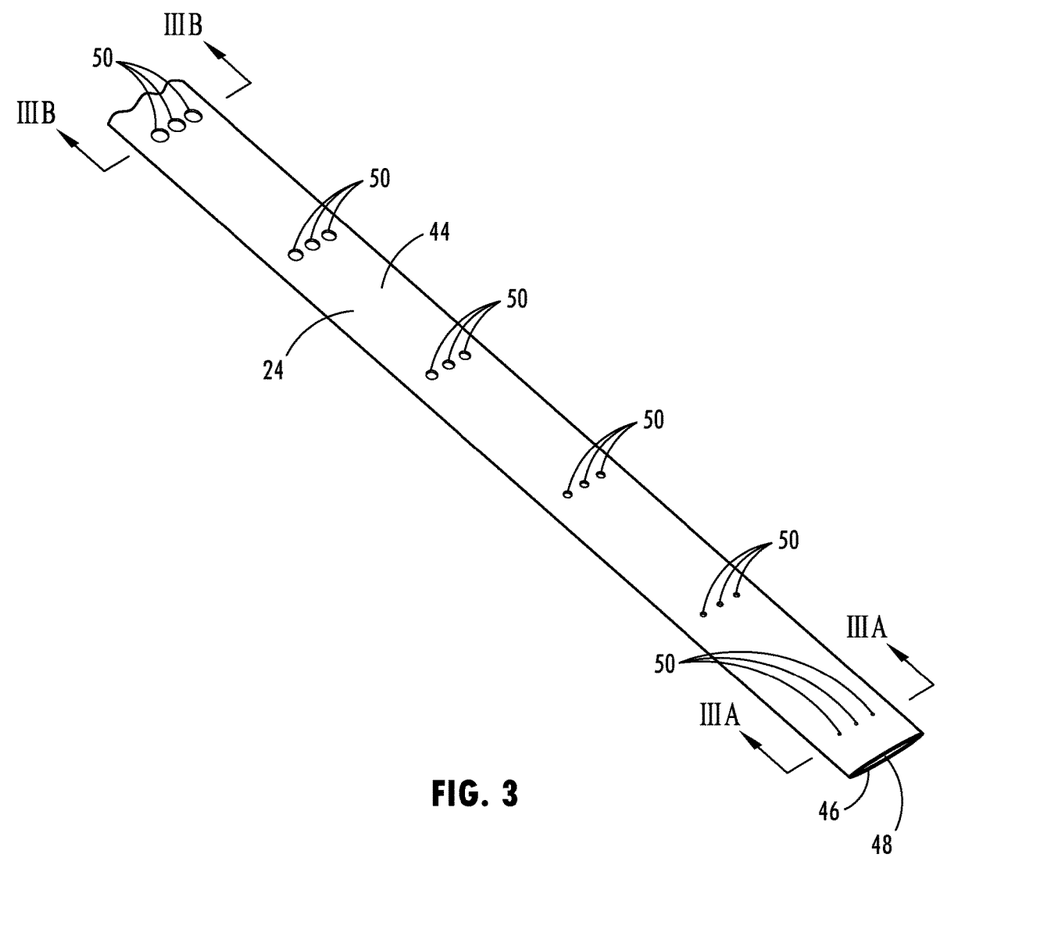
FIG. 3 is an enlarged portion of the seat belt webbing further illustrating the arrangement of air outlets, according to a first embodiment.
Figure 3A:
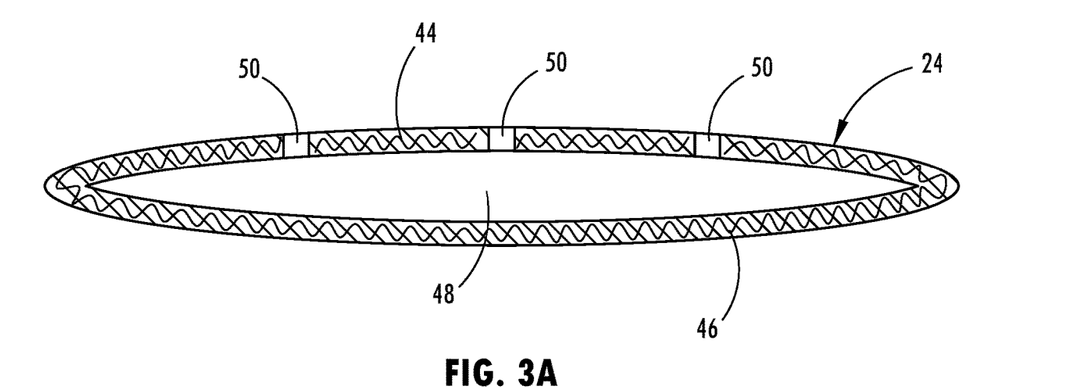
FIG. 3A is a cross-sectional view taken through line IIIA-IIIA of FIG. 3 further illustrating the air outlets.
Figure 3B:
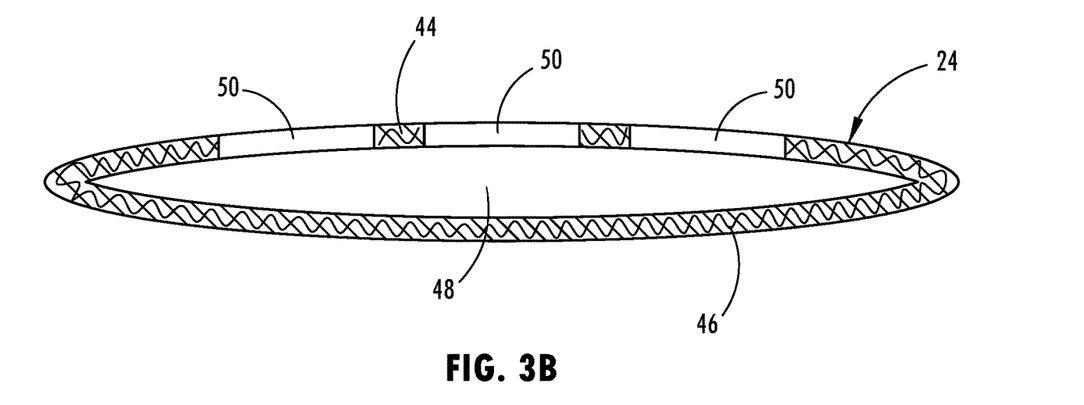
FIG. 3B is a cross-sectional view taken through line IIIB-IIIB of FIG. 3 further illustrating the air outlets.

To achieve the distribution of air in a substantially uniform manner, the vehicle seat belt system 20 may be configured with the exhaust openings 50 formed having a size that varies along the length of the seat belt webbing 24, according to a first embodiment shown in FIGS. 3-3B. In this embodiment, a series of rows of exhaust openings 50 are formed extending from the air inlet side of the webbing 24 where the forced air is delivered with exhaust openings 50 that increase in size in a direction along the path of air flow passing from the inlet side towards the opposite end of the webbing 24. The exhaust openings 24 formed upstream near the inlet side have a small size as seen in FIG. 3A, whereas the exhaust openings 50 formed downstream near the opposite side have a much larger size as seen in FIG. 3B. The area of the exhaust openings 50 formed between the extreme ends of the webbing 24 increase in size at different locations from the inlet side towards the opposite side of the webbing 24.

In the embodiment shown, the exhaust openings 50 have a substantially circular shape and a diameter that varies to achieve the change in size. However, it should be appreciated that the exhaust openings 50 may have other shapes and sizes.

The tubular seat belt webbing 24 is shown in a somewhat collapsed or flattened state having a top layer 44 connected to or integrally formed with a bottom layer 46 with the seat belt passageway 48 therebetween. The seat belt webbing 24 may be formed of a non-permeable material that prevents air from flowing through the material or substantially prevents air from flowing through the material, with the exception of air flowing through the exhaust openings 50. One example of a material suitable for forming the seat belt webbing 24 is a woven polyester which may be coated with a silicone layer to achieve a desired low level or no air permeability. In the embodiment shown, the exhaust openings 50 are formed in the top layer 44 of the webbing 24 such that the pressurized air output from the exhaust openings 50 is blown in close proximity to and around the occupant seated in the seat. The air thereby blows outward from the occupant and creates an air distribution zone around the occupant. Alternatively or in addition, the air exhaust openings 50 could be located in the bottom layer 46 or sides of webbing 24 to blow air onto the occupant or very close to the occupant. The air forced into and entering passageway 48 at the upstream side generally will be at a higher pressure at the inlet side than the air downstream at the opposite end of the seat belt webbing 24. In order to evenly distribute the air output substantially from one end of the seat belt webbing 24 to the other end of the webbing 24, the exhaust openings 50 are sized to be smaller at the air inlet side and increase in size to larger sizes towards the opposite end. As a result, the air flow is substantially uniformly distributed throughout the length of the webbing 24.

Figure 4:
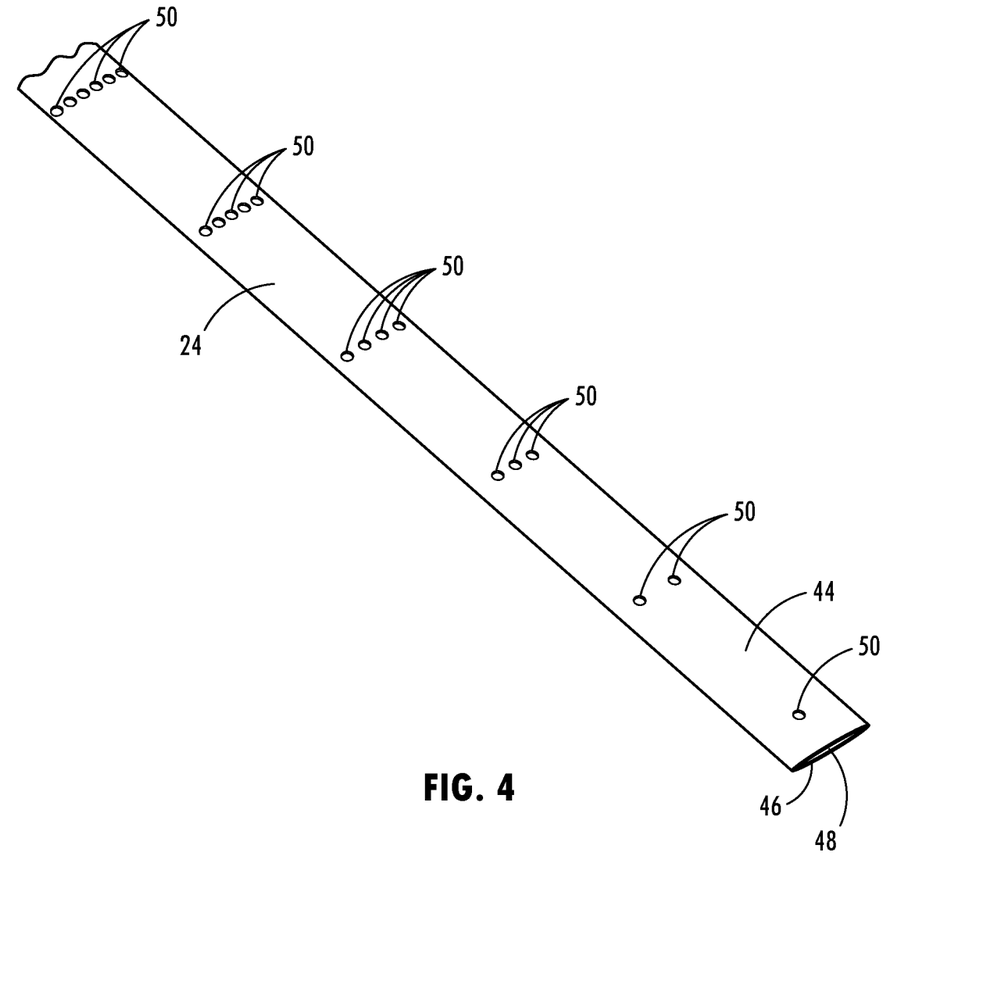
FIG. 4 is an enlarged portion of the seat belt webbing illustrating the arrangement of air outlets, according to a second embodiment.

Referring to FIG. 4, the seat belt webbing 24 is illustrated having an arrangement of exhaust openings 50 that varies in the number of openings 50 at different locations along a length of the webbing 24 from the air inlet end upstream to the opposite end of the seat belt webbing 24 downstream, according to a second embodiment. In this embodiment, the exhaust openings 50 are shown having a substantially uniform size and are located in the top layer 44 to blow air proximate to the occupant seated in the seat. The exhaust openings 50 may be located in the top layer 44, the bottom layer 46, and/or the sides between the top and bottom layers 44 and 46. The exhaust openings 50 may have a substantially circular shape with a diameter that may be the same. It should be appreciated that other shapes and sizes of the exhaust openings 50 may be employed. The number of exhaust openings 50 spaced at different distances along the length of the seat belt webbing 24 varies such that a smaller number of exhaust openings 50 is presented upstream on the inlet end of the seat belt webbing 24 and gradually increase in number downstream toward the opposite end of the webbing 24. As seen in the embodiment shown, a single exhaust opening 50 is located near the inlet to the passageway 48 and at substantially even spaced distances along the length of the seat belt webbing 24, the number of exhaust openings 50 successively increases by one. As a result, the increased number of the exhaust openings 50 along the length of the seat belt webbing 24 allows for a substantially uniform distribution of the air along the length of the seat belt webbing 24.

In addition to employing either a variation in the size or a variation in the number of exhaust openings 50 along a length of the webbing 24 as described above in accordance with the first and second embodiments, it should be appreciated that that the seat belt webbing 24 may include a combination of varying the size and the number of exhaust openings 50 along the length of the webbing 24 so as to achieve a substantially uniform distribution of air output across the length of the seat belt webbing 24. For example, exhaust openings 50 formed near the air inlet side of the seat belt passageway 48 may include a small number of exhaust openings 50 and a small opening size, and the number and size of the exhaust openings 50 may both increase along the length of the seat belt webbing 24 proceeding from the inlet side towards the opposite end of the seat belt webbing 24.

Figure 5:
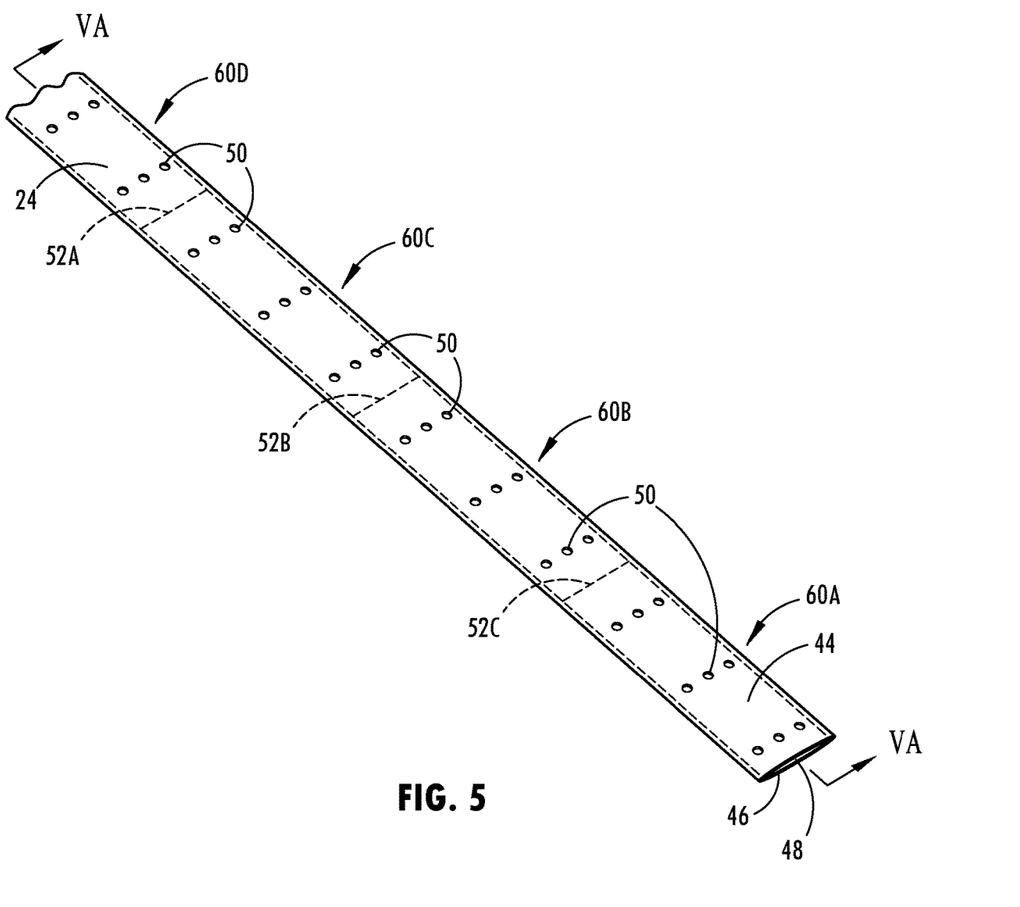
FIG. 5 is an enlarged portion of the seat belt webbing illustrating an arrangement of air outlets, according to a third embodiment.
Figure 5A:
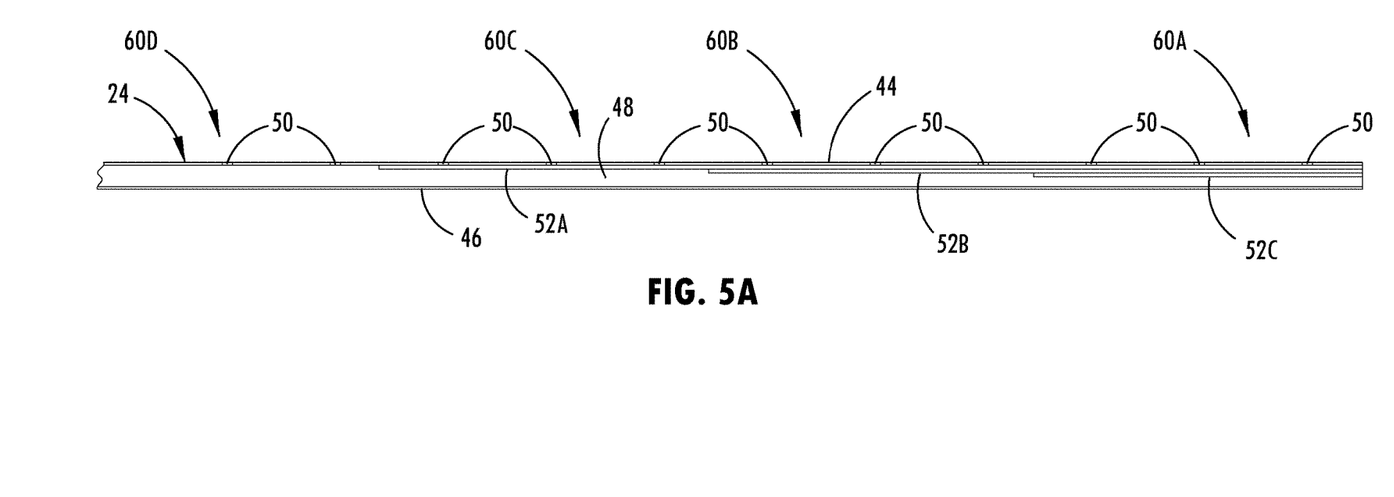
FIG. 5A is a cross-sectional view taken through line VA-VA of FIG. 5 further illustrating the air flow paths.
Figure 5B:
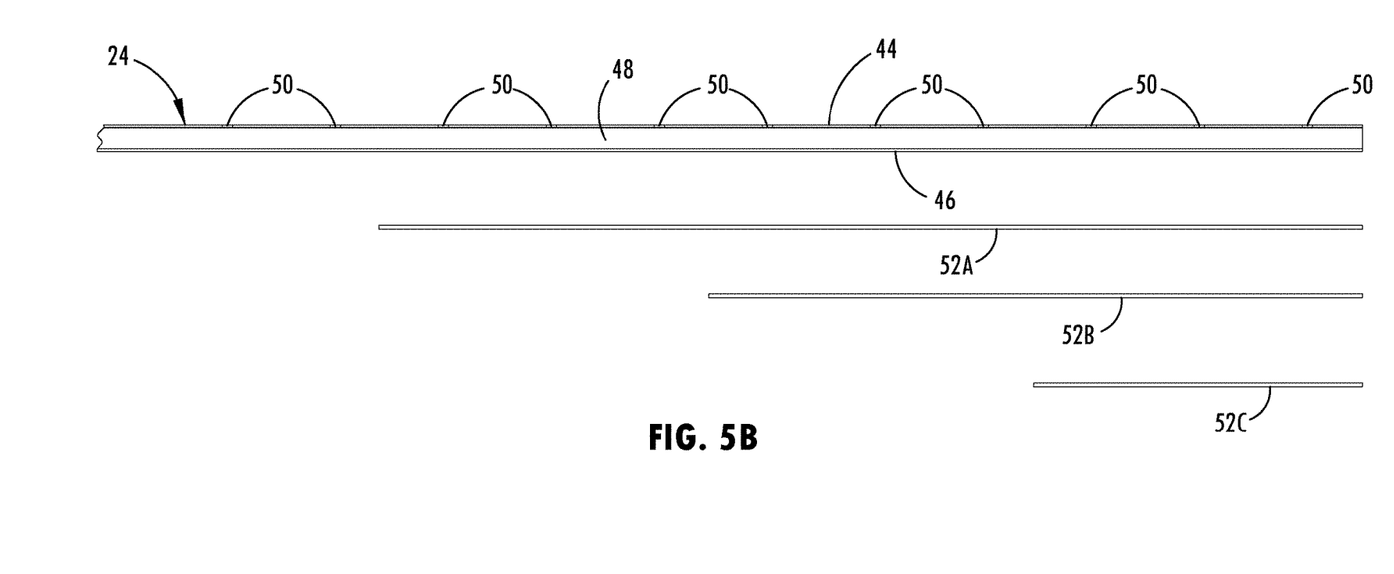
FIG. 5B is an exploded view of the seat belt webbing shown in FIG. 5.

Referring to FIGS. 5-5B, the seat belt webbing 24 is further illustrated having a variable hydraulic air resistance within the air flow passageway 48 so as to distribute the amount of air substantially uniformly amongst four sections 60A-60D of the seat belt webbing 24 along a length of the seat belt webbing 24, according to a third embodiment. Each of the sections 60A-60D has exhaust openings 50 that may be formed in the top layer 44, bottom layer 46 and/or the side layers between the top and bottom layers 44 and 46. In this embodiment, the length of the seat belt webbing 24 illustrated has four successive sections 60A-60D in series which generally output forced air through the exhaust openings 50 substantially uniformly amongst the four sections 60A-60D. This is achieved by employing an air resistance material shown provided by air resistance members 52A-52C located within the air flow passageway 48 of seat belt webbing 24. Each of the hydraulic air resistance members 52A-52C is made of an air permeable material that has a uniform air porosity and the length of the members 52A-52C varies such that the overall air porosity for distributing air to each of the four sections 60A-60D is controlled to evenly distribute the air output from each of the four sections. According to one embodiment, the hydraulic air resistance members 52A-52C may include an air permeable open cell rubber material. According to another embodiment, the members 52A-52C may be made of a porous woven nylon, or nylon spacer mesh (e.g., Mayer fabrics) polyester, polyurethane or other synthetic or natural fibers material. According to other embodiments, the members 52A-52C may include a variable mixture of air porous material or a mix of open and closed cell air porous material. Each of the members 52A-52C provides an air restriction with a given size within the seat belt webbing 24. The members 52A-52C are shown having a substantially rectangular shape and a varying length and are stacked one on top of the other adjacent to the exhaust openings 50. As a result, exhaust openings 50 closer to the air inlet have all three members 52A-52C stacked in front of the exhaust openings 50 such that the air porosity controlled to these exhaust openings 50 is decreased whereas the air porosity of the exhaust openings 50 extending downstream toward the opposite end of the seat belt webbing 24 have a higher air porosity due to the reduced number of members 52A-52C covering the exhaust openings 50. According to another embodiment, the air restriction material may be formed with an air porosity that varies along the length of the webbing 24. In this embodiment, the size of the exhaust openings 50 and the number of the exhaust openings 50 are substantially uniform; however, it should be appreciated that the size of the exhaust openings 50 and the number of the exhaust openings 50 along the length of the seat belt webbing 24 may vary, according to other embodiments.

Figures 6, 6A:
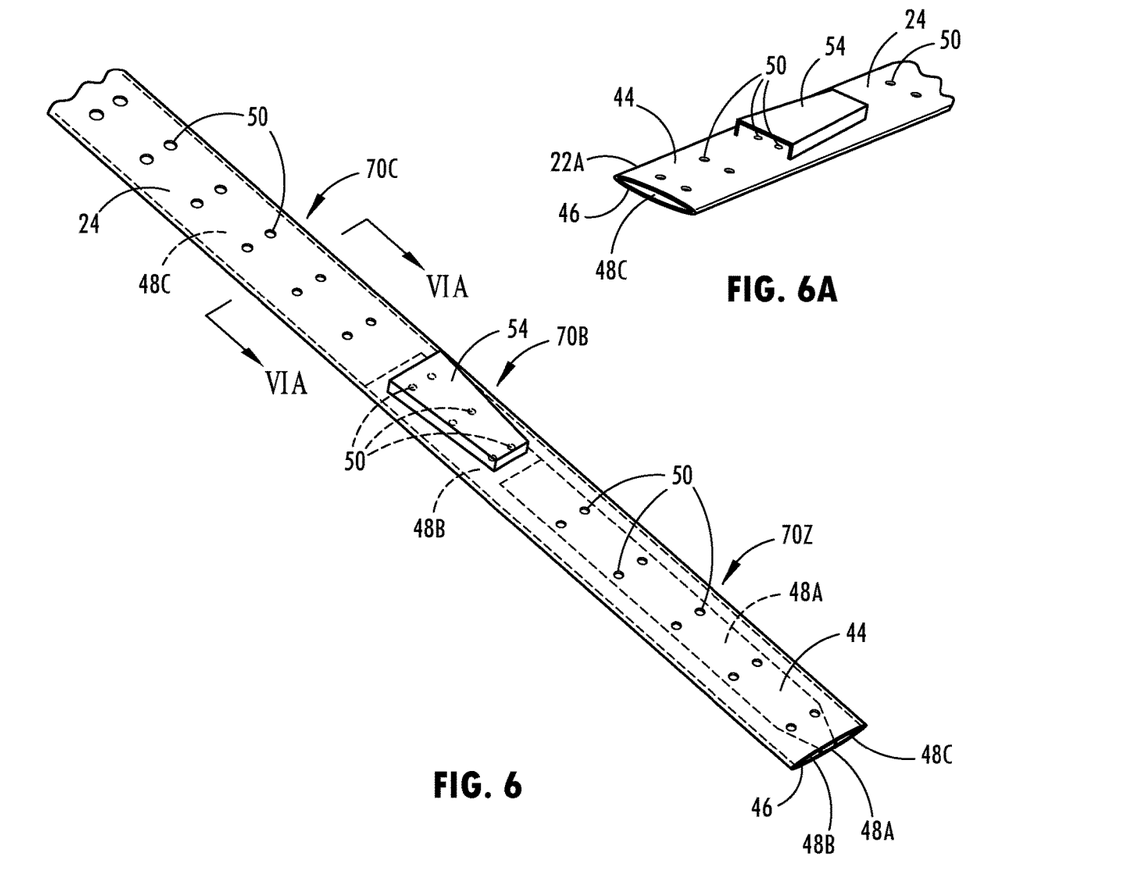
FIG. 6 is an enlarged view of a portion of the seat belt webbing illustrating an arrangement of air outlets, according to a fourth embodiment.
FIG. 6A is a cross-sectional view taken through line VIA-VIA of FIG. 6 further illustrating the air flow paths.
Figure 6B:
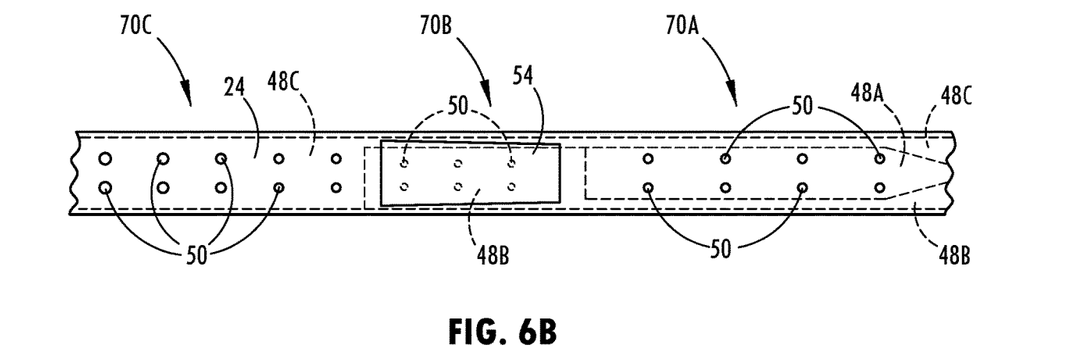
FIG. 6B is a top view of the portion of the seat belt webbing shown in FIG. 6.

Referring to FIGS. 6-6B, the seat belt webbing 24 is further illustrated having a constant air passage hydraulic diameter spacer material that forms a plurality of passageways to control the forced air delivered to three separate sections 70A-70C of the seat belt webbing 24 along a length of the seat belt webbing 24. The three sections 70A-70C may be made by a non-air permeable polymer or plastic or other material that forms separated air flow chambers. Each of sections 70A-70C has exhaust openings 50 that may be formed in the top layer 44, bottom layer 46 and/or the side layers between the top and bottom layers 44 and 46. In this embodiment, a first section 70A closest upstream to the air inlet end of the webbing 24 has exhaust openings 50 that receive forced air within a first air flow passage 48A, a second section 70B in the middle receives forced air within a second air flow passage 48B, and a third section 70C on the downstream end opposite the inlet end receives forced air within a third air flow passage 48C. Each of the first, second, third passageways 48A-48C has its own separate air flow chamber for receiving forced air from the air inlet and delivering the air output in three respective sections 70A-70C via exhaust openings 50. As such, forced air is delivered to each of the three sections 70A-70C separately so as to substantially uniformly distribute the air to each of the sections 70A-70C.

Further, in this embodiment, the middle section 70C is shown having a nozzle 58 which outputs forced air output from the exhaust openings 50 thereunder and directs the forced air in a desired direction towards the occupant's head or face, so as to heat and/or cool the head or face of the occupant. The nozzle may be located on other sections of the seat belt webbing 24 or may be absent in other embodiments.

Accordingly, the vehicle seat belt system 20 advantageously provides for a plurality of exhaust openings 50 in an arrangement whereby forced air is substantially uniformly distributed throughout a length of the seat belt webbing 24 for providing enhanced air flow distribution. The vehicle seat belt system 20 advantageously allows forced air to be delivered through the seat belt buckle into the seat belt webbing 24. The system 20 therefore advantageously provides for enhanced air distribution.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat belt system comprising:
a seat belt comprising a tubular seat belt webbing defining a passageway and a plurality of exhaust openings located along a length of the webbing; and
an air delivery device including a fan supplying forced air to the seat belt, wherein the seat belt is configured such that the air flowing out of the plurality of exhaust openings is substantially evenly distributed along the length of the webbing to create an air distribution zone proximate a seated occupant.

2. The seat belt system of claim 1, wherein the plurality of exhaust openings comprise openings that vary in size, wherein the size of the openings increase with distance from an air inlet along the length of the webbing.

3. The seat belt system of claim 1, wherein the plurality of exhaust openings vary in number at different locations along the webbing, wherein the number of openings of the plurality of exhaust openings increase with distance from an air inlet along the length of the webbing.

4. The seat belt system of claim 1, wherein the webbing has a plurality of air flow passages, each of the plurality of air flow passages controlled to distribute substantially a same air flow to separate sections along the length of the webbing.

5. The seat belt system of claim 1, wherein the seat belt comprises a shoulder belt, wherein the passageway and the plurality of exhaust openings are formed in the shoulder belt.

6. The seat belt system of claim 1 further comprising a buckle for connecting with the seat belt webbing, wherein the air from the air delivery system enters the webbing through the buckle.

7. The seat belt system of claim 1 further comprising a material within the webbing the varies an air flow resistance to control pressure drop through the plurality of exhaust openings.

8. The seat belt system of claim 7, wherein the material comprises at least one of rubber, nylon, polyester and polyurethane.

9. A vehicle seat belt system comprising:
a seat belt comprising a tubular seat belt webbing defining a passageway having an air inlet and a plurality of exhaust openings located along a length of the webbing; and
an air delivery device including a fan supplying forced air to the air inlet into the passageway, wherein the seat belt is configured such that the air flowing out of the plurality of exhaust openings is substantially evenly distributed along the length of the webbing to create an air distribution zone proximate a seated occupant.

10. The seat belt system of claim 9, wherein the plurality of exhaust openings comprise openings that vary in size, wherein the size of the openings increase with distance from the air inlet along the length of the webbing.

11. The seat belt system of claim 9, wherein the plurality of exhaust openings vary in number at different locations along the webbing, wherein the number of openings of the plurality of exhaust openings increase with distance from the air inlet along the length of the webbing.

12. The seat belt system of claim 9, wherein the webbing has a plurality of air flow passages, each of the plurality of air flow passages controlled to distribute substantially a same air flow to separate sections along the length of the webbing.

13. The seat belt system of claim 9, wherein the seat belt comprises a shoulder belt, wherein the passageway and the plurality of exhaust openings are formed in the shoulder belt.

14. The seat belt system of claim 9 further comprising a buckle for connecting with the seat belt webbing, wherein the air from the air delivery system enters the webbing through the buckle.

15. The seat belt system of claim 9 further comprising a material within the webbing that varies an air flow resistance to control pressure drop through the plurality of exhaust openings.

16. The seat belt system of claim 15, wherein the material comprises at least one of rubber, nylon, polyester and polyurethane.

17. A vehicle comprising:
a seat assembly; and
a seat belt system operatively coupled to the seat assembly and comprising:

a seat belt comprising a tubular seat belt webbing defining a passageway and a plurality of exhaust openings located along a length of the webbing; and an air delivery device including a fan supplying forced air to the seat belt, wherein the seat belt is configured such that the air flowing out of the plurality of exhaust openings is substantially evenly distributed along the length of the webbing to create an air distribution zone proximate a seated occupant.

18. The vehicle of claim 17, wherein the exhaust openings comprise openings that vary in size, wherein the size of the openings increase with distance from an air inlet along the length of the webbing.

19. The vehicle of claim 17, wherein the exhaust openings vary in number at different locations along the webbing, wherein the number of openings of the plurality of exhaust openings increase with distance from an air inlet along the length of the webbing.

20. The vehicle of claim 17 further comprising a material within the webbing that varies an air flow resistance.

* * * * *